United States Patent
Fujiwara

(10) Patent No.: US 10,742,675 B2
(45) Date of Patent: Aug. 11, 2020

(54) FRAUDULENT MESSAGE DETECTION DEVICE, ELECTRONIC CONTROL APPARATUS EQUIPPED WITH FRAUDULENT MESSAGE DETECTION DEVICE, FRAUDULENT MESSAGE DETECTION METHOD, AND FRAUDULENT MESSAGE DETECTION PROGRAM

(71) Applicant: Panasonic Intellectual Property Management Co., Ltd., Osaka (JP)

(72) Inventor: Makoto Fujiwara, Kyoto (JP)

(73) Assignee: PANASONIC SEMICONDUCTOR SOLUTIONS CO., LTD., Kyoto (JP)

( * ) Notice: Subject to any disclaimer, the term of this patent is extended or adjusted under 35 U.S.C. 154(b) by 68 days.

(21) Appl. No.: 16/013,239

(22) Filed: Jun. 20, 2018

(65) Prior Publication Data

US 2018/0316710 A1    Nov. 1, 2018

Related U.S. Application Data

(63) Continuation of application No. PCT/JP2016/005116, filed on Dec. 13, 2016.

(30) Foreign Application Priority Data

Dec. 25, 2015 (JP) .................. 2015-255420

(51) Int. Cl.
| | | |
|---|---|---|
| *H04L 29/06* | (2006.01) | |
| *H04L 12/40* | (2006.01) | |
| *H04L 12/413* | (2006.01) | |

(52) U.S. Cl.
CPC ......... *H04L 63/1425* (2013.01); *H04L 12/40* (2013.01); *H04L 12/40169* (2013.01);
(Continued)

(58) Field of Classification Search
CPC ................ H04L 63/1425; H04L 12/40; H04L 12/40169; H04L 12/413;
(Continued)

(56) References Cited

U.S. PATENT DOCUMENTS 5,487,070 A * 1/1996 Furukawa ............ H04J 3/0614
370/507
5,764,938 A * 6/1998 White ................. G06F 9/30032
712/200

(Continued)

FOREIGN PATENT DOCUMENTS

| JP | 2014-146868 A | 8/2014 |
|---|---|---|
| JP | 5664799 B2 | 2/2015 |

(Continued)

OTHER PUBLICATIONS

K.Tindell, et al., Calculating controller area network (can) message response times, Control Engineering Practice, vol. 3, Issue 8, Aug. 1995, pp. 1163-1169.*

(Continued)

*Primary Examiner* — Farid Homayounmehr
*Assistant Examiner* — Raied A Salman
(74) *Attorney, Agent, or Firm* — McDermott Will & Emery LLP

(57) ABSTRACT

Provided is a fraudulent message detection device that detects a fraudulent message in a bus network and includes: a resynchronization detector that detects an edge of a signal on a bus in the bus network and determines whether to perform resynchronization, so as to adjust a sampling point in a one-bit period; a transmission and receiving control unit that obtains a first logical value and a second logical value in a one-bit period after the resynchronization detector determines to perform the resynchronization, the first logical value being a logical value at a sampling point used before (Continued)

the edge is detected, the second logical value being a logical value at a sampling point after the resynchronization is performed; a comparator that compares the first and second logical values; and a fraud detection processing unit that executes post-fraud-detection processing, when the first and second logical values do not coincide.

5 Claims, 11 Drawing Sheets

(52) U.S. Cl.
CPC .. *H04L 12/413* (2013.01); *H04L 2012/40215* (2013.01); *H04L 2012/40273* (2013.01)

(58) Field of Classification Search
CPC . H04L 2012/40215; H04L 2012/40273; H04L 77/0008; H04L 43/087; H04L 69/324
See application file for complete search history.

(56) References Cited

U.S. PATENT DOCUMENTS

| | | | | |
|---|---|---|---|---|
| 6,779,123 B2* | 8/2004 | Simon | ............... | H04L 7/0008 370/519 |
| 7,194,055 B2* | 3/2007 | Tandai | ............... | H04L 7/042 375/145 |
| 10,368,358 B2* | 7/2019 | Adachi | ............... | H04L 12/413 |
| 2005/0221833 A1* | 10/2005 | Granzow | ............... | H04W 52/50 455/450 |
| 2006/0010389 A1* | 1/2006 | Rooney | ............... | H04L 63/1425 715/736 |
| 2014/0328352 A1* | 11/2014 | Mabuchi | ............... | H04L 12/4035 370/451 |
| 2014/0334314 A1* | 11/2014 | Fredriksson | ............... | H04J 3/07 370/242 |
| 2015/0358351 A1* | 12/2015 | Otsuka | ............... | H04L 12/4625 726/23 |
| 2015/0372767 A1* | 12/2015 | Inoue | ............... | H04B 10/116 398/118 |
| 2017/0048272 A1* | 2/2017 | Yamamura | ............... | H04L 63/08 |
| 2017/0244477 A1* | 8/2017 | Seo | ............... | H04W 72/0446 |
| 2017/0373821 A1* | 12/2017 | Arakawa | ............... | H04L 7/0008 |
| 2017/0374073 A1* | 12/2017 | Schoppmeier | ............ | H04L 9/08 |

FOREIGN PATENT DOCUMENTS

| | | | | |
|---|---|---|---|---|
| JP | 2017069965 A | * | 4/2017 | ......... H04L 63/1425 |
| WO | 2013/094072 A1 | | 6/2013 | |
| WO | 2014/191788 A1 | | 12/2014 | |

OTHER PUBLICATIONS

T. Gojevic, et al., Mobile network protection system against fraudulent and unwanted messaging traffic, May 21-25, 2012, 2012 Proceedings of the 35th International Convention MIPRO, pp. 671-674.*

Extended European Search Report issued in Application No. 16877961.9 dated Sep. 12, 2018.

Tsutomu Matsumoto, et al., "Electrical Data Forgery Based on CAN Synchronization Features", 2015 Symposium on Cryptography and Information Security, SCIS2015, Jan. 2015 with English Translation.

International Search Report issued in Application No. PCT/JP2016/005116 dated Mar. 7, 2017, with English translation.

* cited by examiner

FRAUDULENT MESSAGE DETECTION DEVICE, ELECTRONIC CONTROL APPARATUS EQUIPPED WITH FRAUDULENT MESSAGE DETECTION DEVICE, FRAUDULENT MESSAGE DETECTION METHOD, AND FRAUDULENT MESSAGE DETECTION PROGRAM

CROSS REFERENCE TO RELATED APPLICATIONS

This application is a U.S. continuation application of PCT International Patent Application Number PCT/JP2016/005116 filed on Dec. 13, 2016, claiming the benefit of priority of Japanese Patent Application Number 2015-255420 filed on Dec. 25, 2015, the entire contents of which are hereby incorporated by reference.

BACKGROUND

1. Technical Field

The present disclosure relates to a device that detects a fraudulent message on a network to which devices are connected that are capable of communicating using a communications protocol such as carrier-sense multiple access with collision avoidance (CSMA/CA).

2. Description of the Related Art

It is possible to connect a device etc. that updates programs of an automotive diagnostic device or electronic control unit (hereinafter abbreviated as ECU) provided by a manufacturer or car dealer, via, as a connection terminal to a controller area network (CAN) for an in-vehicle network, a data link connector (hereinafter abbreviated as DLC) to the CAN. In a communication system disclosed in Patent Literature (PTL) 1 (International Application Publication Ser. No. 13/094,072), a message is flowed to a communication line of a network at specified communication intervals, and a communication device that has received a message detects message reception intervals, and determines the validity of the received message by comparing a difference between the reception intervals and the communication intervals with a reference range.

SUMMARY

In a method of determining the validity of a message disclosed by PTL 1, however, when a difference between communication intervals and reception intervals is within a reference range, even a fraudulent message is erroneously determined to be valid. Moreover, using a narrower reference range in an attempt to avoid this problem more often causes erroneous determination that a valid message is a fraudulent message, which reduces communication efficiency.

The present invention provides a fraudulent message detection device etc. that detects falsification of a message by an electronic attack, determines the validity of the message with a higher degree of accuracy, and achieves a more highly secure CAN network without reducing communication efficiency.

A fraudulent message detection device according to one aspect of the present invention is a fraudulent message detection device that detects a fraudulent message transmitted to a bus in a bus network, and includes: a resynchronization detector that detects an edge of a signal on the bus and determines whether to perform resynchronization based on the edge, so as to adjust a sampling point that is a point in time when a voltage of the bus is read to obtain a logical value of the signal during a one-bit period; a receiver that obtains a first logical value and a second logical value during a one-bit period after the resynchronization detector determines to perform the resynchronization, the first logical value being a logical value on the bus at a sampling point used before the edge is detected, the second logical value being a logical value on the bus at a sampling point after the resynchronization based on the edge is performed; a comparator that compares the first logical value and the second logical value obtained by the receiver; and a fraud detection processing unit that executes post-fraud-detection processing associated with a case in which a fraudulent message is detected, when the comparator determines that the first logical value and the second logical value do not coincide.

Moreover, a fraudulent message detection method according to one aspect of the invention is a fraudulent message detection method for detecting a fraudulent message transmitted to a bus in a bus network, and includes: detecting an edge of a signal on the bus and determining whether resynchronization based on the edge is to be performed, so as to adjust a sampling point that is a point in time when a voltage of the bus is read to obtain a logical value of the signal during a one-bit period; obtaining a first logical value and a second logical value during a one-bit period, after the resynchronization is determined to be performed in the detecting and determining, the first logical value being a logical value on the bus at a sampling point used before the edge is detected, the second logical value being a logical value on the bus at a sampling point after the resynchronization based on the edge is performed; comparing the first logical value and the second logical value obtained in the obtaining; and executing post-fraud-detection processing associated with a case in which a fraudulent message is detected, when the first logical value and the second logical value are determined not to match in the comparing.

Moreover, a fraudulent message detection program according to one aspect of the present invention is a fraudulent message detection program for causing a processor to execute the above fraudulent message detection method.

It should be noted that those general or specific aspects of the present invention may be realized as a system, a method, an integrated circuit, a computer program, a computer-readable recording medium such as a CD-ROM, or any combination thereof.

A fraudulent message detection device, fraudulent message detection method, and fraudulent message detection program according to the present invention determine the validity of a message with a higher degree of accuracy and achieve a more highly secure CAN network without reducing communication efficiency.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Underlying Knowledge Forming the Basis of the Present Invention

The inventor obtained a piece of literature (NPL 1: Matsumoto, Tsutomu et al., "Electrical Data Forgery Based on CAN Synchronization Features", The 32nd Symposium on Cryptography and Information Security 2015 (SCIS 2015).) that indicates a CAN attack technique using a fraudulent message undetectable by the communication system described in the BACKGROUND ART section. First, the following describes a configuration of a CAN network and an outline of the attack technique with reference to the drawings, using an example of the in-vehicle communication system including the CAN network.

Outline of Configuration of CAN Network

Figure 1A:
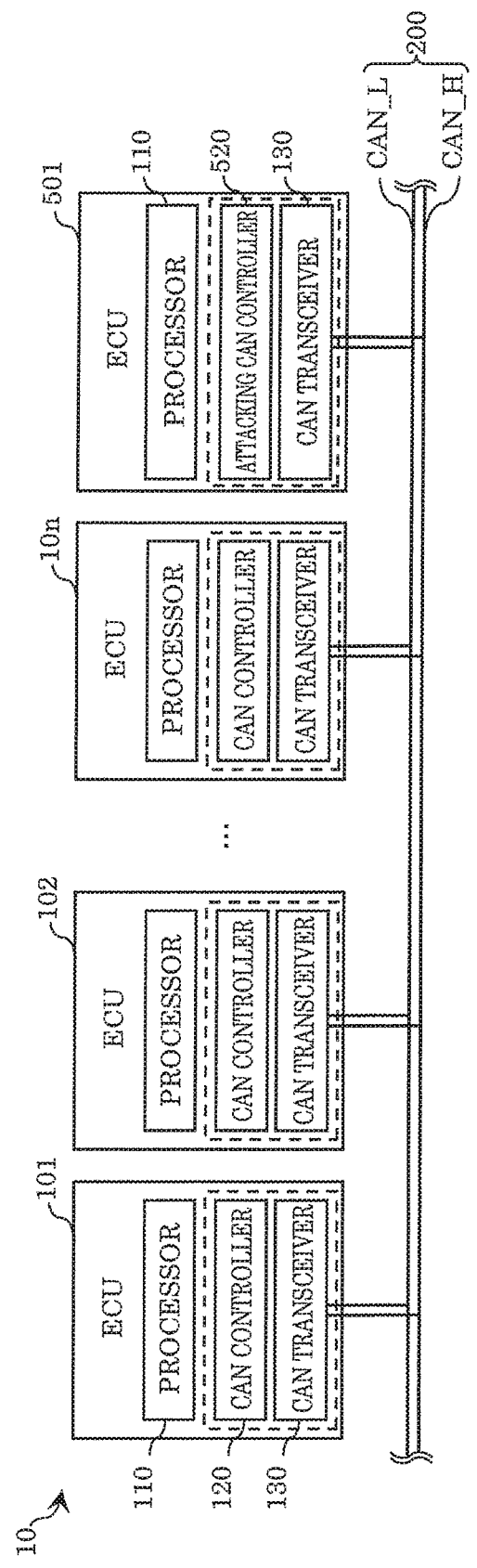
FIG. 1A is a block diagram illustrating an example of a hardware configuration of an in-vehicle communication system including a CAN network.

FIG. 1A is a block diagram illustrating an example of a hardware configuration of in-vehicle communication system 10 including a CAN network.

In-vehicle communication system 10 is a bus network including CAN bus 200, which is a communication bus, and ECUs 101 to 10n (hereinafter also collectively referred to as ECUs 100) and 501, which are nodes connected to CAN bus 200. It should be noted that for the purpose of describing the attack technique, ECU 501 is included in this configuration, but is not included in a normal in-vehicle communication system. In this regard, however, the following are assumed as possible examples in real life: as illustrated in the figure, a configuration in which one of in-vehicle devices connected to CAN bus 200 and each including ECUs is a malicious device, and in this configuration, an attack by the malicious in-vehicle device to disturb the other in-vehicle devices by transmitting a fraudulent message over CAN bus 200.

ECUs 100 and 501 (hereinafter also collectively referred to simply as nodes) may each be, for example, an ECU of an engine control system, an ECU of a brake system, an ECU of an air conditioning system, or an ECU of a car navigation system. These ECUs account for a small portion of examples of an ECU of a communication device connected to an in-vehicle communication system included in a modern-day vehicle, and are included in a variety of control systems. ECUs are communicable with each other via CAN bus 200, and may be both receiving ECUs and transmitting ECUs. Note that it is assumed that ECU 501 may be a device exclusively aimed at attacking. Although not shown, a sensor or an actuator may be connected to each ECU via an interface other than CAN bus 200.

CAN bus 200 includes two signal lines CAN_L and CAN_H, and has terminating resistors (not shown) that stabilize a signal, on the signal lines. It should be noted that although each of the signal lines is schematically represented by a straight line in the figure, the signal lines are achieved using a twisted pair having noise resistance.

In the CAN network, a logical value (numeric data of 0 or 1) of each bit of a digital signal is indicated by a level of a differential voltage (hereinafter also referred to simply as the presence or absence of a difference) between signal lines CAN_L and CAN_H, and serial communication is performed in which the value of each bit is sequentially transmitted using non-return-to-zero (NRZ). Specifically, a state in which a differential voltage is large indicates 0, and a state in which a differential voltage is small indicates 1. The nodes are each connected to both signal lines CAN_L and CAN_H. Each of the nodes transmits a signal by applying a voltage to each of signal lines CAN_L and CAN_H, and receives a signal by obtaining differential voltage between signal lines CAN_L and CAN_H. It should be noted that according to the CAN standards, logical 0 and logical 1 are called dominant and recessive, respectively, and logical 0 takes priority over logical 1 on CAN bus 200. Specifically, when at least two of the nodes transmit logical 0 and logical 1 to CAN bus 200 at the same time, logical 0 is of higher priority, so that CAN bus 200 is driven to the voltage indicating logical 0. Moreover, when one of the nodes transmits logical 1 and then another of the nodes transmits logical 0, a signal over CAN bus 200 is overwritten with logical 0, that is, CAN bus 200 is driven to the voltage indicating logical 0. Hereinafter, a state in which the voltage of CAN bus 200 indicates logical 0 of a signal and a state in which the voltage of CAN bus 200 indicates logical 1 of a signal are also referred to as a dominant state and a recessive state, respectively.

It should be noted that no specific master device that controls entire communication is present on the CAN network (a multi-master system). Moreover, in order to avoid a collision between messages, two or more messages cannot be present at a time on CAN bus 200, and each node can start to transmit a message when CAN bus 200 is idle. The message transmitted by each node is broadcast to all the nodes connected to CAN bus 200. The message is transmitted in accordance with a format called a frame prescribed in the CAN standards.

Figure 2:
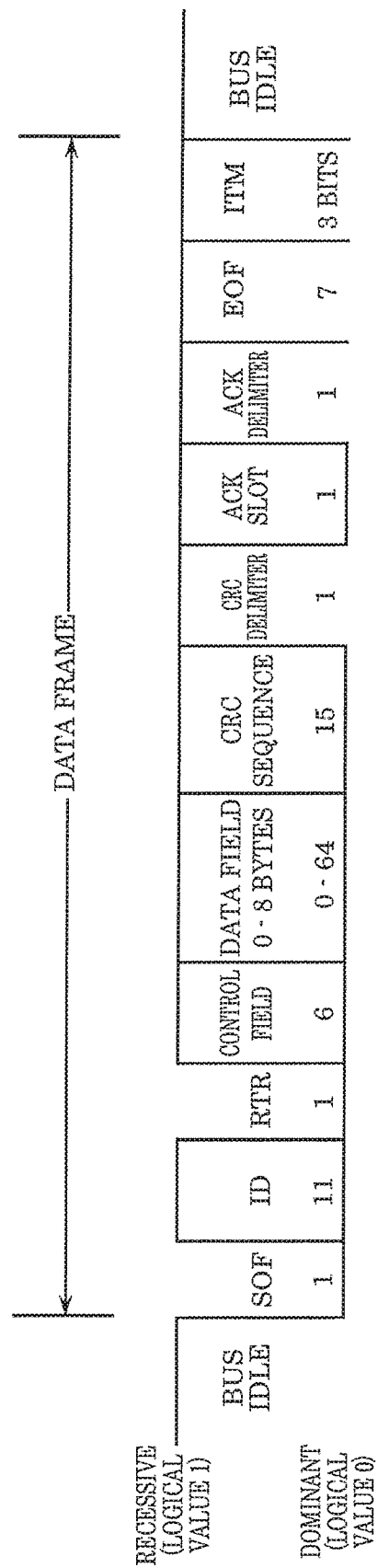
FIG. 2 is a diagram illustrating a standard format of a data frame prescribed in the CAN standards.

Each frame includes an identifier (hereinafter abbreviated as ID) indicating a transmitting node. FIG. 2 shows a standard format of a data frame that is one of frame formats prescribed in the CAN standards. The start of the data frame is indicated in the left portion of the figure, and CAN bus 200 is idle before and after the data frame. The data frame includes slots by use that are arranged chronologically, and numeric values in the figure each indicate a bit number (length) used for a corresponding one of the slots. Moreover, upper and lower horizontal lines each indicate a logical value of a signal that may be included in a corresponding one of the slots. For example, the ID slot is data having 11-bit length that starts at the second bit from the start of the data frame and may include both logical 0 and 1. When two or more of the nodes access to CAN bus 200 at the same time for transmission, a collision is avoided in accordance with the order of priority among frames based on the ID included in each of the frames, and a higher-priority frame transmitted (CSMA/CA). The ID is also used by each node as a basis for determining whether the node uses the received frame.

It should be noted that the CAN standards have a total of four frame types including the above-described data frame, and one of the frame types is an error frame transmitted by a node detecting an error. Since the error frame has no direct relationship to the problem to be solved by the present invention, the following describes only the outline thereof. When the error frame is transmitted, the latest transmission by a transmitting node is suspended, and other nodes receiving the same message discard the message. Subsequently, the transmitting node performs retransmission.

Each node has the same basic configuration. In an example of FIG. 1A, each node includes processor 110, CAN controller 120 or attacking CAN controller 520, and CAN transceiver 130. Their reference signs are omitted. from ECUs 102 to 10n. Although CAN controller 120 and attacking CAN controller 520 are distinguished because CAN controller 120 and attacking CAN controller 520 differ in part of function, CAN controller 120 and attacking CAN controller 520 have the same basic configuration. First, the following describes the common configurations and operations of CAN controller 120 and attacking CAN controller 520.

Processor 110 is, for example, a central processing unit, and executes arithmetic processing according to the function of a system including each node.

CAN controller 120 and attacking CAN controller 520 are each implemented by, for example, a microcontroller, and execute communication processing. The details of CAN controller 120 and attacking CAN controller 520 will be described below in addition to differences between CAN controller 120 and attacking CAN controller 520.

CAN transceiver 130 is an integrated circuit for an interface between CAN controller 120 of each ECU and CAN bus 200, and carries out conversion between a value of a differential voltage on CAN bus 200 and a logical value used by CAN controller 120.

Figure 1B:
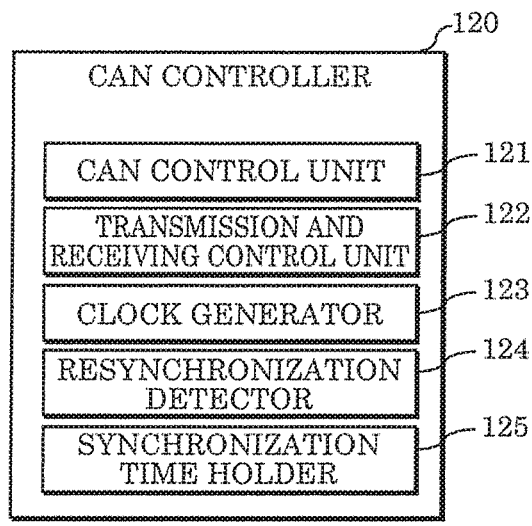
FIG. 1B is a functional configuration diagram of a CAN controller.
Figure 1C:
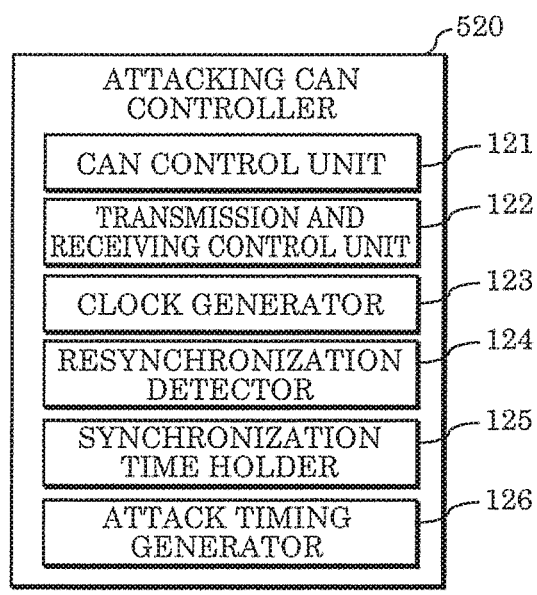
FIG. 1C is a functional configuration diagram of an attacking CAN controller.

The following describes the details of CAN controller 120 and attacking CAN controller 520 with reference to FIG. 1B and FIG. 1C. FIG. 1B is a functional configuration diagram of CAN controller 120, and FIG. 1C is a functional configuration diagram of attacking CAN controller 520. Common structural elements are assigned common reference signs. CAN controller 120 and attacking CAN controller 520 each include CAN control unit 121, transmission and receiving control unit 122, clock generator 123, resynchronization detector 124, and synchronization time holder 125. Each of the structural elements performs a function of executing the communication processing in conformity to the CAN protocol.

CAN control unit 121 controls the entire operation of CAN controller 120.

Transmission and receiving control unit 122 is an interface for inputting and outputting a message between processor 110 and CAN transceiver 130. Transmission and receiving control unit 122 performs, via CAN transceiver 130, reading and writing of a logical value of a signal on CAN bus 200. Transmission and receiving control unit 122 serves as, for example, a transmission unit that causes CAN transceiver 130 to apply a predetermined voltage to each of signal lines CAN_L and CAN_H according to a value of a digital signal inputted by processor 110. Transmission and receiving control unit 122 also serves as a receiver that reads the voltages of signal lines CAN_L and CAN_H of CAN bus 200, and obtains the logical value of the signal on CAN bus 200 on the basis of the level (or presence or absence) of the voltages.

Clock generator 123 is an oscillator circuit and generates a system clock to be used as a reference for data processing timing and message transmission and reception timing. The time length of one bit of the signal (hereinafter referred to as a one-bit period) is determined using the system clock. This one-bit period is set to have the same length for the nodes connected to CAN bus 200.

It should be noted that in order for the nodes to appropriately communicate with each other on the CAN network, in addition to the equal length of the one-bit period for the nodes, the nodes need to be synchronized with each other in timing of transition between bits. However, even if the nodes are synchronized with each other at the initial state, an unallowable large time difference between the nodes in timing may be caused by, for example, an error in a system clock among the nodes. The tune difference the CAN network is addressed by an operation called resynchronization that is performed by a receiving node upon a recessive to dominant transition (hereinafter referred to as an edge) in a signal on CAN bus 200 transmitted by a transmitting node. More specifically, when the edge occurs, resynchronization detector 124 of the receiving node determines whether to perform resynchronization based on the edge, and performs the resynchronization.

Figure 3:
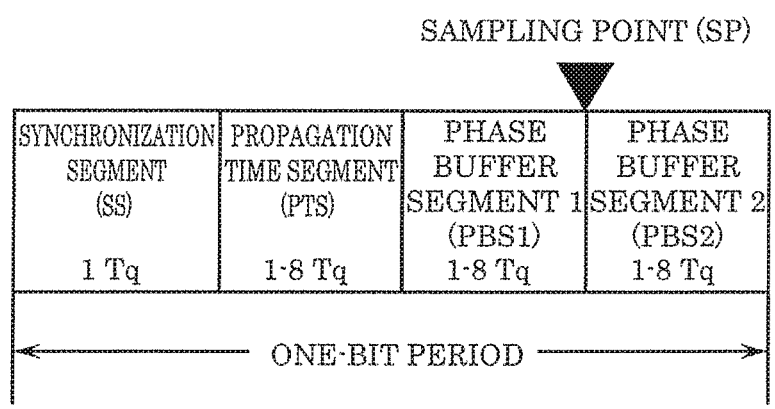
FIG. 3 is a diagram illustrating four logical segments constituting a one-bit period prescribed in the CAN standards.
Figure 4:
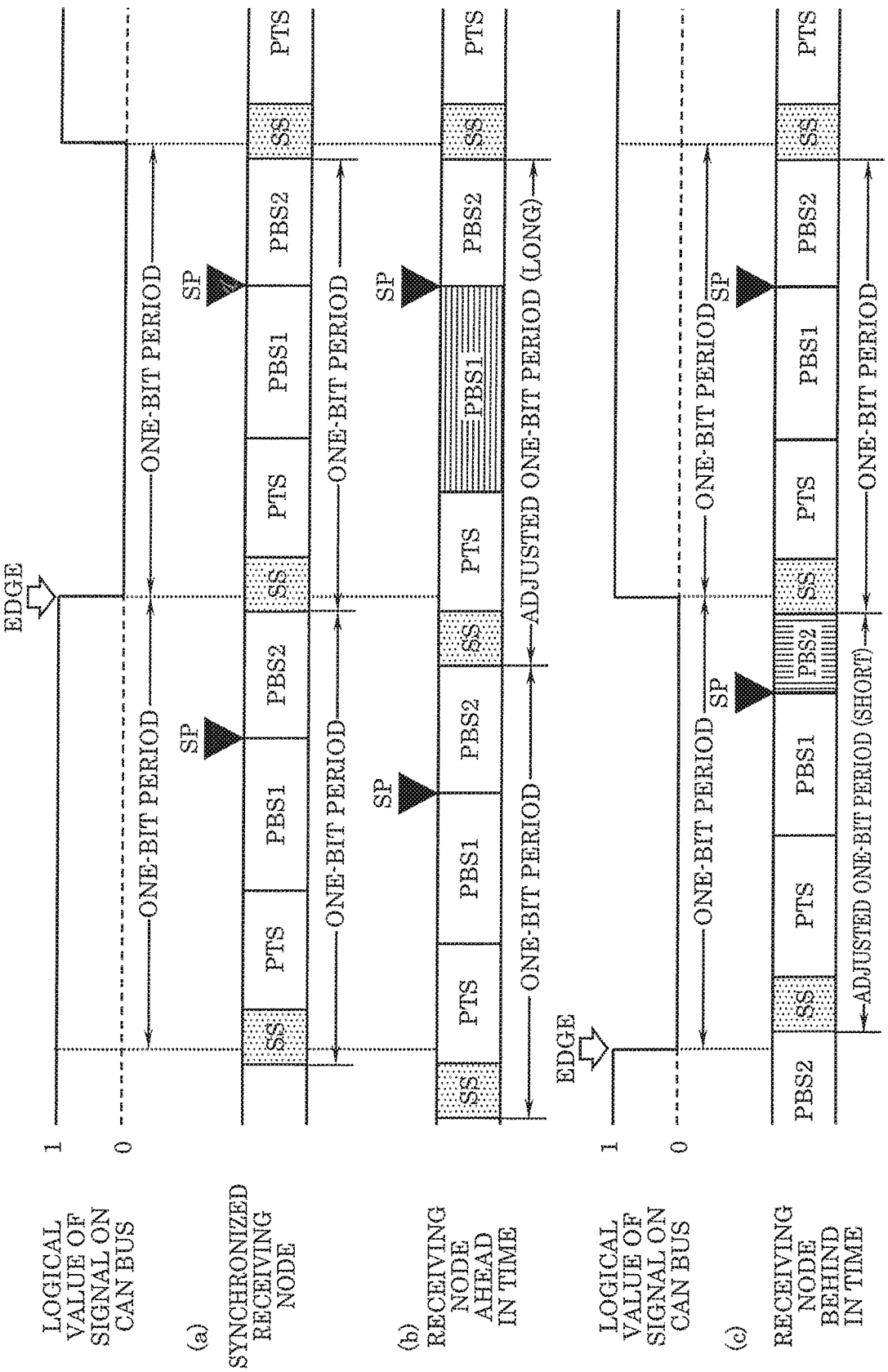
FIG. 4 is a diagram illustrating patterns of a time difference between a one-bit period and an edge of a signal, and examples of adjustment of the one-bit period.

Since the resynchronization relates to the attack assumed in the present application, the following describes the outline thereof. For the resynchronization, a timing control mechanism called bit timing is used in which the one-bit period is divided into four logical segments represented in a unit referred to as a time quantum (hereinafter abbreviated as Tq). FIG. 3 shows these four segments. The four segments are called synchronization segment (shown as SS in the figure), propagation time segment (shown as PTS in the figure), phase buffer segment 1 (shown as PBS1 in the figure), and phase buffer segment 2 (shown as PBS2 in the figure), respectively, according to the CAN standards. It should be noted that a sampling point (shown as SP in the figure) in the figure is a point in time during the one-bit period, and is a point in time at which voltages of signal lines CAN_L and CAN_H are read (sampled) via CAN transceiver 130 such that CAN controller 120 obtains a logical value of a signal on CAN bus 200 as 1-bit data during the one-bit period. A sampling point is fixed at, for example, a time (Tq) having the start of the one-bit period as a reference (beginning) and is held by synchronization time holder 125. The end of phase buffer segment 1 is located on a sampling point. Resynchronization detector 124 detects an edge of a signal on CAN bus 200 via CAN transceiver 130, and determines whether to perform resynchronization based on the edge. More specifically, resynchronization detector 124 determines, on the basis fa segment in which the edge has occurred, whether to perform resynchronization, and the content of the resynchronization when resynchronization detector 124 has determined to perform the resynchronization. Among the four segments, the synchronization segment is called an allowable time difference, and resynchronization is not performed when an edge occurs in the segment of 1 Tq. In other words, when the edge occurs in any segment other than the synchronization segment, resynchronization detector 124 determines to perform the resynchronization. The resynchronization is performed by adjusting the length of the one-bit period after the time difference is detected, and the content of the resynchronization includes a segment of which the length is changed, and the degree of change. The adjustment of the one-bit period will be described with reference to the drawings. FIG. 4 is a diagram illustrating patterns of a time difference between a one-bit period and an edge of a signal, and examples of adjustment of the one-bit period.

A one-bit period of a receiving node shown in (a) of FIG. 4 has no time difference from an edge of a signal, that is, the receiving node is synchronous with a transmitting node. In this case, the one-bit period is not adjusted.

In the case of a receiving node shown in (b) of FIG. 4, the edge of the signal occurs in a segment after a synchronization segment of the receiving node and before a sampling point. In this case, since the receiving node is ahead in time compared with the transmitting node, phase buffer segment 1 (the horizontal-striped segment in the figure) is extended. As a result, a time difference between the edge of the signal (the beginning of a one-bit period of the transmitting node) and the sampling point is adjusted. In addition, the beginning of the next one-bit period of the receiving node is delayed by the extension of the one-bit period by the adjustment, and thereby the receiving node is synchronized with the transmitting node.

In the case of a receiving node shown in (c) of FIG. 4, an edge of a signal occurs in a segment after a sampling point of the receiving node. In this case, since the receiving node is behind in time compared with the transmitting node, phase buffer segment 2 (the vertical-striped segment in the figure) is shortened. As a result, in the next one-bit period, a time difference between the edge of the signal (the beginning of a one-bit period of the transmitting node) and the sampling point is adjusted. In addition, the beginning of the next one-bit period of the receiving node is advanced by the shortening of the one-bit period by the adjustment, and thereby the receiving node is synchronized with the transmitting node.

As described above, the sampling point is appropriately adjusted relative to a signal transmission timing of the transmitting node, by adjusting the length of the one-bit period using the resynchronization. It should be noted that the degree of change of the lengths of phase buffer segment 1 and phase buffer segment 2 is appropriately determined within a predetermined range in accordance with the degree of time difference.

Figure 5:
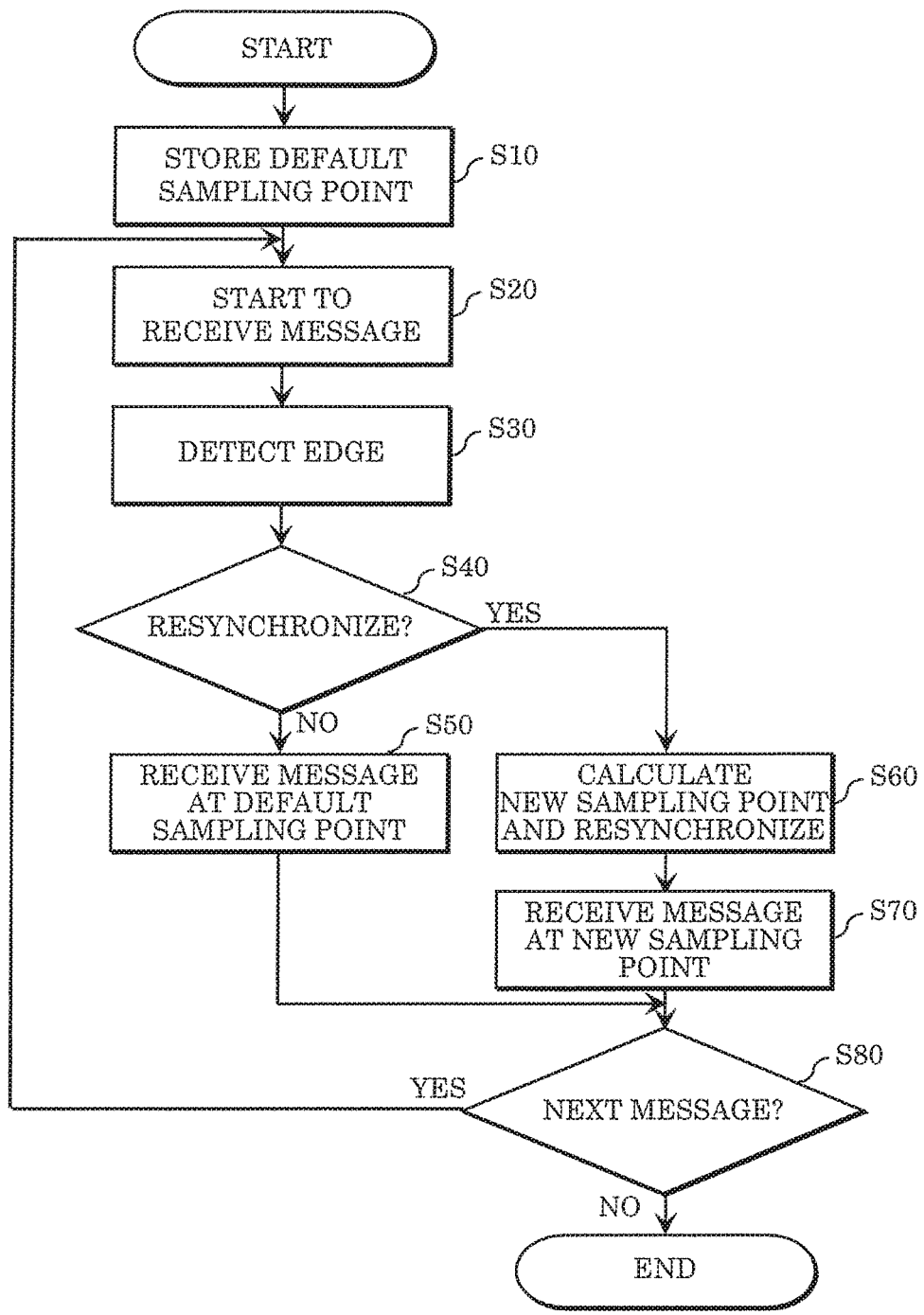
FIG. 5 is a flowchart representing an operation of receiving a message by an ECU in a CAN network.

Each of ECUs 100, which includes CAN controller 120 having the above-described configuration, receives a message by performing the operation shown in the flowchart of FIG. 5.

First, in ECU 100, a sampling point is held in synchronization time holder 125 (step S10). The sampling point is a default sampling point, and is set when, for example, each in-vehicle system including ECU 100 is designed. The sampling point is at the end of phase buffer segment 1 as mentioned above, and, for example, setting the length of each segment in the one-bit period by Tq unit determines the temporal position of the sampling point from the start of the one-bit period. Although setting the sampling point itself is not an operation of ECU 100, it is included in the flowchart for the purpose of describing data to be stored in synchronization time holder 125.

ECU 100 starts to receive the message via CAN controller 120 and CAN transceiver 130, using the sampling point (step S20). To put the receiving of the message differently, transmission and receiving control unit 122 of CAN controller 120 reads voltages of signal lines CAN_L and CAN_H of CAN bus 200 via CAN transceiver 130 at a sampling point in each of successive one-bit periods (based on a signal clock generated by clock generator 123). A logical value of a signal on CAN bus 200 is obtained on the basis of the read voltages. The logical value obtained by transmission and receiving control unit 122 is transmitted as the data of the message to processor 110 of ECU 100.

ECU 100 further detects, while sequentially obtaining the logical value by reading the voltages at the sampling point in each one-bit period as above, an edge on the basis of a change of the logical values (step S30), and determines whether to perform resynchronization (step S40). To put the determining differently, resynchronization detector 124 of CAN controller 120 determines whether to perform the resynchronization, on the basis of which segment of the one-bit period a point in time at which the edge is detected is in.

When ECU 100 determines not to perform the resynchronization (NO in step S40), ECU 100 receives the message continuously using the default sampling point (step S50). When ECU 100 determines to perform the resynchronization (YES in step S40), for example, transmission and receiving control unit 122 calculates appropriate timing of the next sampling point. The length of phase buffer segment 1 or phase buffer segment 2 is changed in accordance with the timing of the calculated new sampling point (performing the resynchronization, step S60). Consequently, ECU 100 receives a message using the adjusted new sampling point (step S70).

Subsequently, when a message is on CAN bus 200 (YES in step S80), ECU 100 receives the message (step S20), and when no message is on CAN bus 200 (NO in step S80), ECU 100 ends the receiving. It should be noted that when ECU 501 also receives a message, ECU 501 may perform the operation shown in the flowchart of FIG. 5.

Outline of Attack Technique

Next, the following describes a difference in configuration between attacking CAN controller 520 and CAN controller 120, and an attack operation of attacking CAN controller 520.

Attacking CAN controller 520 differs from CAN controller 120 in including attack timing generator 126. In in-vehicle communication system 10, by performing the following operations, attacking CAN controller 520 falsifies a message transmitted by ECU 100.

First, transmitting ECU 100 transmits a message as logical values sequentially indicated on CAN bus 200, and receiving ECU 100 receives the message by sequentially obtaining the logical values of a signal on CAN bus 200 each at a point in time (sampling point) that is a predetermined time difference after and within a one-bit period from the transmission of the logical value by transmitting ECU 100.

Attacking CAN controller 520 of ECU 501, a malicious ECU, causes receiving ECU 100 to misidentify transmission timing of message from transmitting ECU 100, by electrically manipulating a logical value of a signal on CAN bus 200, for a very short time of approximately 1 Tq (first attack).

Receiving ECU 100, which misidentified the transmission timing of message, obtains the logical value of the signal on CAN bus 200 using a false sampling point with an inappropriate time difference from a correct transmission timing.

Attacking CAN controller 522 electrically manipulates again the logical value of the signal on CAN bus 200 with timing matched to the false sampling point (second attack). As a result, receiving ECU 100 receives a message different from the message transmitted by transmitting ECU 100.

Attack timing generator 126 sets timing with which attacking CAN controller 520 respectively launches the first attack and the second attack by the above electrical manipulation (manipulation of voltage). Next, the following describes the timing and manipulation of voltage.

Figure 6:
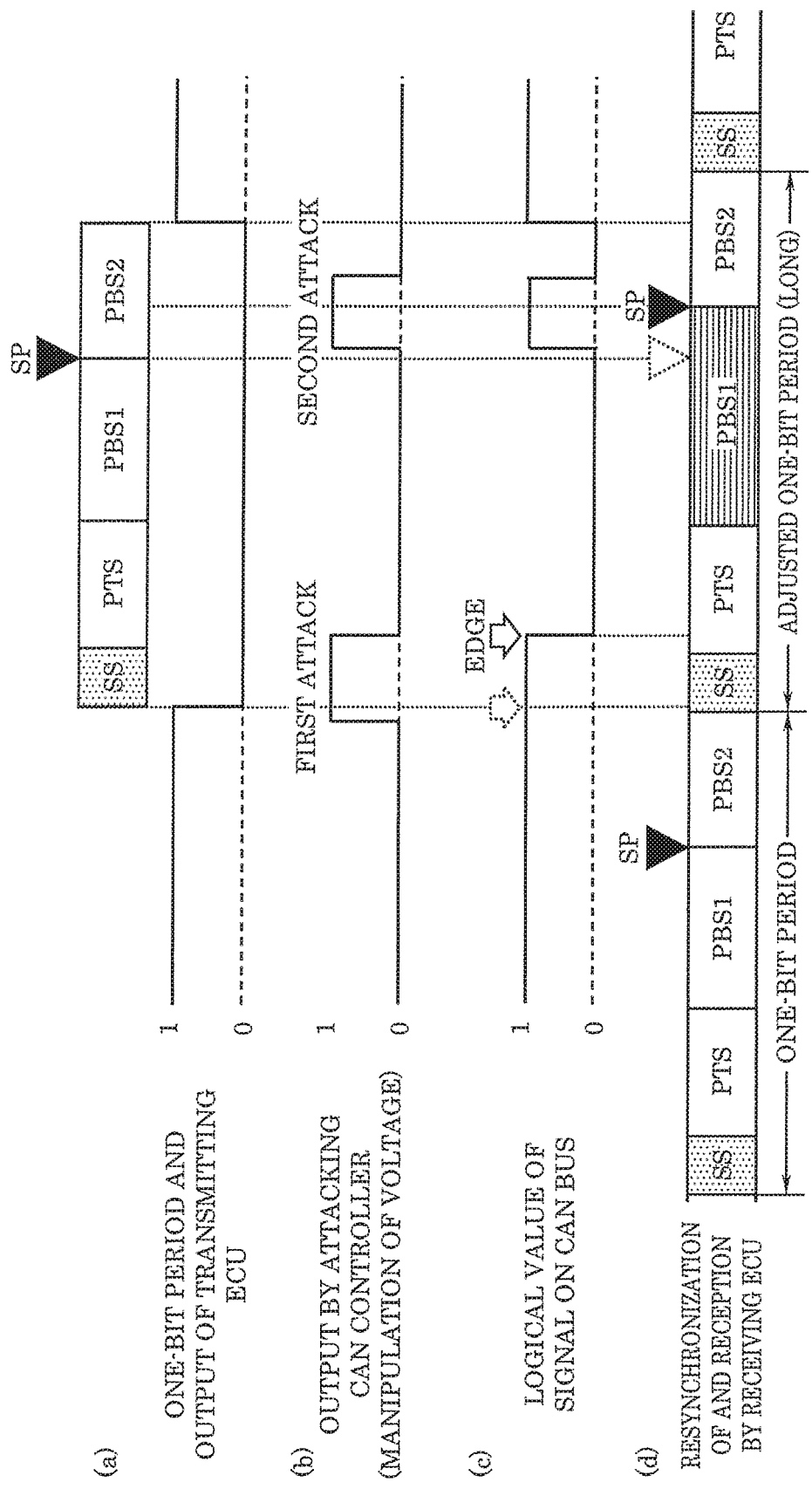
FIG. 6 is a diagram illustrating attack timings of and manipulation of voltage by the attacking CAN controller.

FIG. 6 is a diagram illustrating attack timing of and manipulation of voltage by attacking CAN controller 520.

First, transmitting ECU 100 transmits logical 0. In the meantime, attacking CAN controller 520 transmits logical 1 for a very short time concurrently with the start of transmission of logical 0 by ECU 100 (first attack). This delays a change of the logical value of the signal on CAN bus 200 from 1 to 0, that is, transition of CAN bus 200 from a recessive state to a dominant state. It should be noted that as described above, logical 0 called dominant takes priority over logical 1 called recessive, and CAN transceiver 130 connects attacking CAN controller 520 to CAN bus 200 in a manner opposite to the manner CAN transceiver 130 of ECU 100 connects CAN controller 120 to CAN bus 200. In other words, a line that should be connected to CAN_H is connected to CAN_L, and a line that should be connected to CAN_L, is connected to CAN_H. Consequently, the transition of CAN bus 200 from the dominant state to the recessive state is made possible by reverse voltages canceling out each other on each signal line.

The delay of the transition of CAN bus 200 from the recessive state to the dominant state caused by the first attack is namely a delay of occurrence of an edge. In (c) of the figure, with absence of the first attack, an edge would occur at a point in time indicated by a dashed arrow. The first attack, however, delays the occurrence of the edge to a point in time indicated by a solid arrow. When detecting the edge, a receiving ECU performs resynchronization in a manner that depends on in which segment the edge has occurred, as described above. In the example shown in the figure, since the edge has occurred in the propagation time segment, the receiving ECU performs the resynchronization by extending phase buffer segment 1 (see (d) of the figure). In consequence, a sampling point which would be at a point in time indicated by a dashed triangle with absence of the first attack is delayed to a point in time indicated by a black triangle.

Next, attacking CAN controller 520 transmits logical 1 for a very short time simultaneously with the sampling point of the receiving ECU (second attack). As a result, the receiving ECU obtains not logical 0 transmitted by the transmitting ECU but logical 1 as the logical value of the signal in the one-bit period. The message is thus falsified by the two-stage attack of attacking CAN controller 520, and the receiving ECU receives a fraudulent message.

It should be noted that the transmitting ECU monitors voltages on CAN bus 200 at the sampling point of the transmitting ECU (see (a) of the figure). However, since the second attack of attacking CAN controller 520 sends the false logical value at a time away from the sampling point, the transmitting ECU is not capable of detecting the falsification.

The following describes an embodiment of a device that detects a fraudulent message resulting from a falsification by the foregoing attack of a malicious ECU.

It should be noted that the embodiment described below shows a general or specific example. Numerical values, shapes, materials, structural components, the arrangement and connection of the structural components, steps, the sequence of the steps, etc. shown in the following embodiment are mere examples, and are not intended to limit the scope of the present invention. Furthermore, among the structural components in the following embodiment, structural components not recited in any one of the independent claims that indicate the broadest concepts are described as optional structural components.

EMBODIMENT

Figure 7A:
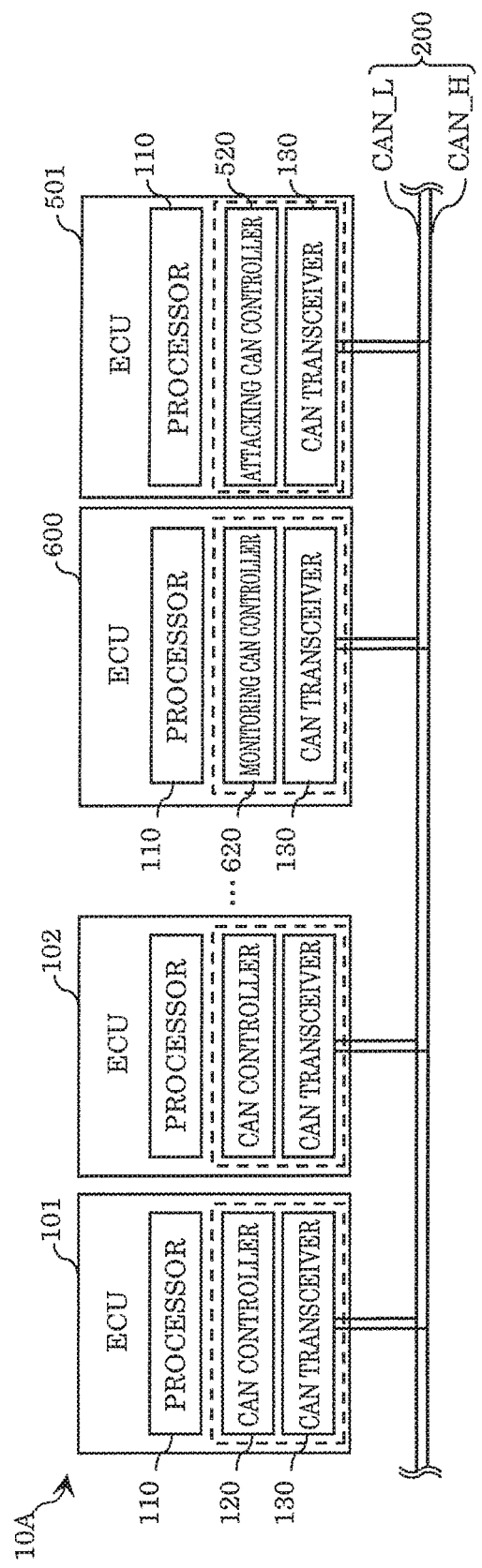
FIG. 7A is a block diagram illustrating an example of a hardware configuration of an in-vehicle communication system including a fraudulent message detection device in an embodiment.

FIG. 7A is a block diagram illustrating an example of a hardware configuration of in-vehicle communication system 10A including a fraudulent message detection device in the embodiment. As with in-vehicle communication system 10, in-vehicle communication system 10A is a bus network including CAN bus 200, which is a communication bus, and ECUs 100, which are nodes connected to CAN bus 200.

In addition, in-vehicle communication system 10A includes ECU 501 and ECU 600. ECU 501 is the aforementioned malicious ECU, and is included in the configuration for the purpose of describing the occurrence of attack below.

As with other ECUs 100 and 501 of in-vehicle communication system 10A, ECU 600 is connected as a single ECU to CAN bus 200. Although ECU 600 includes processor 110 and CAN transceiver 130 in the same manner as the other ECUs, ECU 600 differs from ECUs 100 in including, instead of CAN controller 120, monitoring CAN controller 620, the fraudulent message detection device in the embodiment. Next, the following describes monitoring CAN controller 620 with reference to FIG. 7B.

Figure 7B:
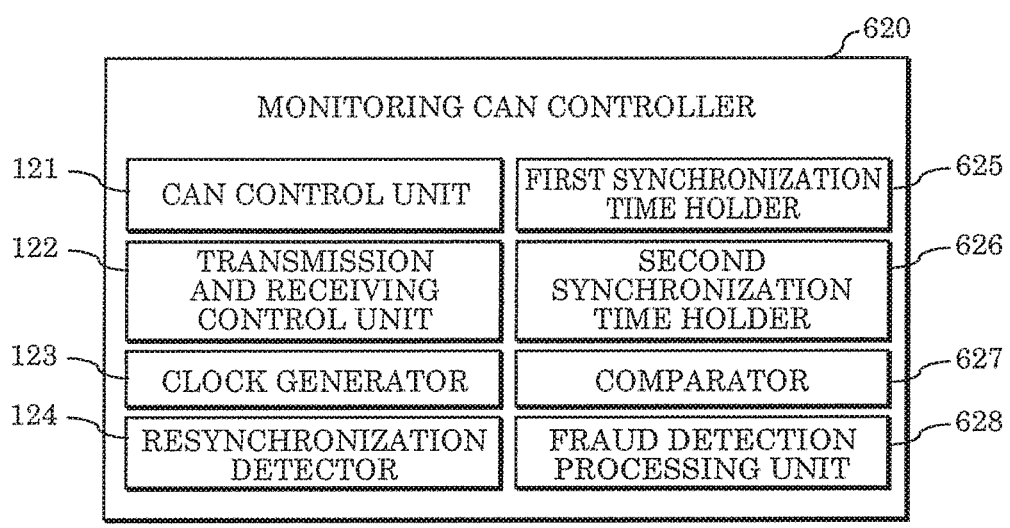
FIG. 7B is a functional configuration diagram of the fraudulent message detection device in the embodiment.

FIG. 7B is a functional configuration diagram of monitoring CAN controller 620, the fraudulent message detection, device in the embodiment.

Monitoring CAN controller 620, which is the fraudulent message detection device that detects a fraudulent message transmitted to CAN bus 200, includes CAN control unit 121, transmission and receiving control unit 122, clock generator 123, and resynchronization detector 124. Since these structural components are intended to achieve a function of executing the communication processing in accordance with the CAN protocol, and are common to ECUs 100, detailed descriptions thereof are omitted.

Monitoring CAN controller 620 further includes first synchronization time holder 625, second synchronization time holder 626, comparator 627, and fraud detection processing unit 628.

First synchronization time holder 625 and second synchronization time holder 626 each hold a sampling point in the same manner as synchronization time holder 125. However, when resynchronization detector 124 detects an edge and determines to perform resynchronization based on the edge, first synchronization time holder 625 continues to hold a sampling point (hereinafter also referred to as an old sampling point) used before the edge is detected. In contrast, when resynchronization detector 124 detects an edge and determines to perform resynchronization based on the edge, second synchronization time holder 626 holds a sampling point (hereinafter also referred to as a new sampling point) adjusted by the resynchronization. Transmission and receiving control unit 122 obtains a logical value on CAN bus 200 at the new sampling point and a logical value on CAN bus 200 at the old sampling point (hereinafter referred to as a first logical value and a second logical value, respectively) when the resynchronization is performed.

Comparator 627 compares the first logical value and second logical value obtained at the new and old sampling points, and determines whether the first logical value and the second logical value coincide.

When comparator 627 determines that the first logical value and the second logical value do not coincide, fraud detection processing unit 628 executes post-fraud-detection processing that is processing associated with a case in which a fraudulent message is detected.

Figure 8:
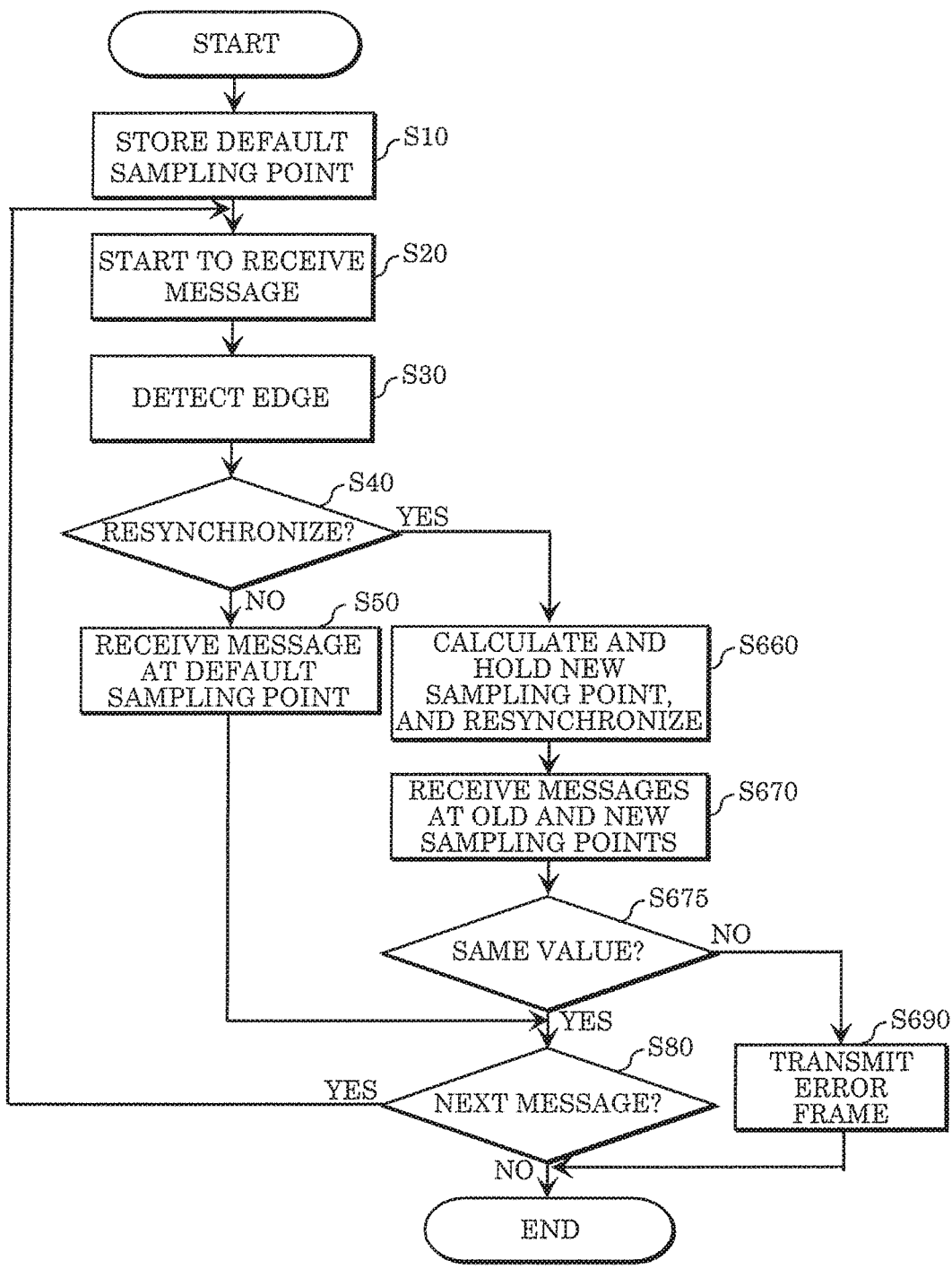
FIG. 8 is a flowchart representing operations of monitoring a CAN bus and detecting a fraudulent message by an ECU including the fraudulent message detection device in the embodiment.

ECU 600 including monitoring CAN controller 620 having the above configuration monitors CAN bus 200 and detects a fraudulent message by performing the operations shown in the flowchart of FIG. 8. FIG. 8 is the flowchart representing the operations of monitoring CAN bus 200 and detecting a fraudulent message by ECU 600 including monitoring CAN controller 620 in the embodiment. It should be noted that in FIG. 8 the same steps as the operation of receiving a message by ECU 100 shown in FIG. 5 are assigned the same reference signs.

First, in ECU 600, a default sampling point is held in first synchronization time holder 625 (step 810). Although setting the sampling point itself is not an operation of ECU 600, it is included in the flowchart for the purpose of describing data to be stored in first synchronization time holder 625.

ECU 600 starts to receive a message via monitoring CAN controller 620 and CAN transceiver 130, using the sampling point (step S20). To put the receiving of the message differently, transmission and receiving control unit 122 of monitoring CAN controller 620 reads the voltages of signal lines CAN_L and CAN_H of CAN bus 200 via CAN transceiver 130 at a sampling point in each of successive one-bit periods (based on a signal clock generated by clock generator 123). A logical value of a signal on CAN bus 200 is obtained on the basis of the read voltages. The logical value obtained by transmission and receiving control unit 122 is transmitted as the data of the message to processor 110 of ECU 600.

ECU 600 further detects, while sequentially obtaining the logical value by reading the voltages at the sampling point in each one-bit period as above, an edge on the basis of a change of the logical values (step S30), and determines whether to perform resynchronization based on the edge (step S40). To put the determining differently, resynchronization detector 124 of monitoring CAN controller 620 determines whether to perform the resynchronization, on the basis of which segment of the one-bit period a point in time at which the edge has been detected is in.

When ECU 600 determines not to perform the resynchronization (NO in step S40), ECU 600 receives the message continuously using the default sampling point (step S50). When ECU 600 determines to perform the resynchronization (YES in step S40), for example, transmission and receiving control unit 122 calculates appropriate timing of the next sampling point. Second synchronization time holder 626 holds the calculated new sampling point. As a result, monitoring CAN controller 620 holds both the default sampling point, that is, the old sampling point, and the calculated new sampling point. In the meantime, the length of phase buffer segment 1 or phase buffer segment 2 is changed in accordance with the timing of the calculated new sampling point (performing the resynchronization, step S660).

Here, ECU 600 receives the message, and transmission and receiving control unit 122 of monitoring CAN controller 620 obtains a logical value on CAN bus 200 at the new sampling point as a first logical value, and a logical value on CAN bus 200 at the old sampling point as a second logical value (step S670).

Figure 9:
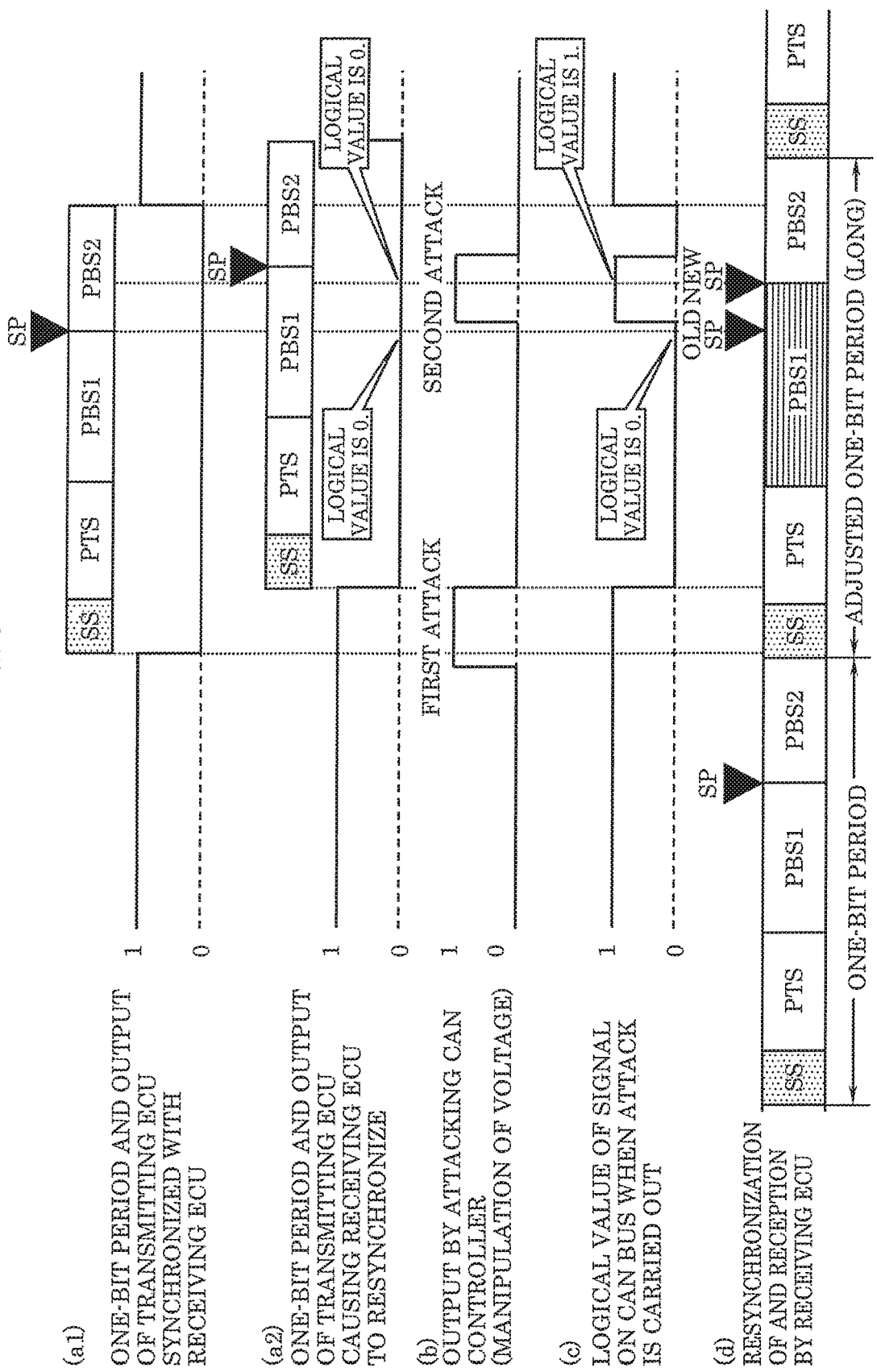
FIG. 9 is a diagram illustrating logical values obtained at two sampling points when the attacking CAN controller carried out attacks.

Comparator 627 compares the first logical value and the second logical value that are obtained, and determines whether the first logical value and the second logical value coincide (S675). The following describes a reason for determining whether a first logical value and a second logical value coincide. FIG. 9 is a diagram illustrating logical values obtained at two sampling points when attacking CAN controller 520 carried out attacks.

First, a case is assumed in which when transmitting ECU 100 and ECU 600, a receiving ECU, shown in (a1) are synchronized with each other, ECU 600 performs resynchronization as a result of a first attack by attacking CAN controller 520 shown in (b). In this case, receiving ECU 600 performs the receiving of messages in step S670, at an old sampling point and a new sampling point shown in (d). Here, a logical, value of a signal on CAN bus 200 changes as shown in (c). Specifically, at the old sampling point, since attacking CAN controller 520 has not yet carried out a second attack, the logical value of the signal on CAN bus 200 is not falsified and remains 0 in accordance with the output of transmitting ECU 100. This is because transmitting ECU 100 performs bit monitoring at the old sampling point, and thus attacking CAN controller 520 carries out the second attack at a time away from the old sampling point. On the other hand, at the new sampling point, as described with reference to FIG. 6, attacking CAN controller 520 falsifies the value on CAN bus 200 from 0 to 1. Consequently, when resynchronization is performed by the attack of attacking CAN controller 520, the logical values of the signal on CAN bus 200 at the old sampling point and the new sampling point do not coincide. Accordingly, the logical values obtained by transmission and receiving control unit 122 of ECU 600 at the new sampling point and the old sampling point do not coincide.

In contrast, as shown in (a2), when resynchronization is performed because ECU 100 and ECU 600 are not synchronous with each other, a logical value of a signal on CAN bus 200 changes in accordance with the output of ECU 100. Accordingly, the logical values obtained at the new sampling point and the old sampling point by transmission and receiving control unit 122 of ECU 600 coincide.

As described above, it is possible to determine the presence or absence of the attack of the malicious ECU, by determining whether the logical values obtained at the old sampling point and the new sampling point coincide.

When the first logical value and the second logical value are determined to coincide (YES in step S675), ECU 600 performs a normal operation, that is, proceeds to determine whether the next message is on CAN bus 200. When the message is on CAN bus 200 (YES in step S80), ECU 600 receives the message (step S20), and when no message is on CAN bus 200 (NO in step S80), ECU 600 ends the receiving.

When the first logical value and the second logical value are determined not to coincide (NO in step S675), fraud detection processing unit 628 executes the post-fraud-detection processing, which is processing associated with a case in which a fraudulent message is detected, in ECU 600. Examples of such post-fraud-detection processing may include transmitting, to CAN bus 200, a frame notifying the occurrence of an error in communication on the network, such as the above-described error frame. This allows ECU 100 receiving the message falsified in in-vehicle communication system 10A to discard the message, and also transmitting ECU 100 to perform retransmission. Alternatively, a warning may be sent to a user via a user interface not shown in the figure such as a screen of in-vehicle communication system 10A. This allows the user to learn that the malicious ECU is connected to in-vehicle communication system 10A, and addresses the situation.

As described above, a fraudulent message detection device in the embodiment is a fraudulent message detection device that detects a fraudulent message transmitted to a bus in a bus network, and includes: a resynchronization detector that detects an edge of a signal on the bus and determines whether to perform resynchronization based on the edge, so as to adjust a sampling point that is a point in time when a voltage of the bus is read to obtain a logical value of the signal during a one-bit period; a receiver that obtains a first logical value and a second logical value during a one-bit period after the resynchronization detector determines to perform the resynchronization, the first logical value being a logical value on the bus at a sampling point used before the edge is detected, the second logical value being a logical value on the bus at a sampling point after the resynchronization based on the edge is performed; a comparator that compares the first logical value and the second logical value obtained by the receiver; and a fraud detection processing unit that executes post-fraud-detection processing associated with a case in which a fraudulent message is detected, when the comparator determines that the first logical value and the second logical value do not coincide. The fraudulent message detection device determines validity of messages with a higher degree of accuracy by more reliably detecting falsification of the messages by a malicious ECU on the network, and thus ensures the safety operation of a vehicle when the fraudulent message detection device is configured as an exemplary device including the network according to the embodiment.

It should be noted that the device or system including ECU 600 described in the aforementioned embodiment is not particularly limited. Although the case has been described in which ECU 600 detects the falsification of the message when receiving the message, ECU 600 may be an ECU included in a communication device that transmits a message other than an error frame as well. Further, ECU 600 may be an ECU of any system connected to an in-vehicle communication system such as an ECU of an air conditioning system or an ECU of a car navigation system. In addition, ECU 600 may be an ECU included in a device connected as a device dedicated for monitoring a network. Moreover, monitoring CAN controller 620 may be included in an ECU of a gateway that connects CAN buses. In this case, monitoring CAN controller 620 may monitor the CAN buses connected via the gateway.

Advantageous Effects

As stated above, the fraudulent message detection device having the aforementioned configuration determines validity of messages with a higher degree of accuracy by surely detecting falsification of the messages by a malicious ECU on the network.

Another conceivable technique against such an attack other than the fraudulent message detection device having the configuration is a method based on the number of electrical changes on a CAN bus during a one-bit period. Examples of the method include a method in which logical value reading on a CAN bus is performed repeatedly within a one-bit period as if by scanning the CAN bus with a shortened cycle. With this method, however, detection of an electrical change as an attack can be avoided when the attack is carried out by manipulating voltage between samplings. Although it is logically possible to further shorten a cycle between sampling points to make more difficult such avoidance of the detection, power consumption or the cost of a memory for storing a logical value to be obtained increases accordingly. In contrast, by comparison with the conventional CAN controller, the fraudulent message detection device in the embodiment shortens a cycle between samplings when resynchronization is performed and the resynchronization may be followed by voltage manipulation by a malicious device. As a result, the power consumption or the cost of the memory is increased to a limited extent.

Moreover, the examples of the method include a method in which a transmitting ECU includes, in a message to be transmitted, a message authentication code (MAC) to allow a receiving ECU to detect data falsification. In this method, since the use of each slot of a data frame is prescribed in the CAN standards as shown in FIG. 2, a MAC is to be inserted in a data field among the slots. However, a MAC to ensure sufficient security generally has 128-bit length, and does not fall within 64 bits, which is the predetermined maximum length of a data field. Although it is also conceivable to use a shorter, simplified MAC, use of a shortened MAC is a trade-off with higher security. Even if a short MAC is used, an amount of information included in a data field is limited accordingly, and resulting in decreased communication efficiency. Moreover, in order to ensure security with MACs, each of ECUs on a network needs to include a circuit to process the MACs, and consequently cost is increased and also it takes time to expand use of the circuit. In contrast, the fraudulent message detection device in the embodiment is capable of detecting falsification of data on a network even when only one of the ECUs on the network includes the fraudulent message detection device and monitors change in the manipulation of voltage on the CAN bus. Thus, the fraudulent message detection device can be easily applied to the existing network. Moreover, since the fraudulent message detection device in the embodiment does not use a data field to detect a fraudulent message, there is no influence on the communication efficiency.

The monitoring CAN controller included in the ECU has been described as the fraudulent message detection device that detects a fraudulent message transmitted to a bus network, in the in-vehicle communication system including communication devices connected to the bus network. It should be noted that, for example, an attack using the above-mentioned mechanism of resynchronization can be carried out not only on an in-vehicle network but also on any network meeting the CAN standards. For this reason, the fraudulent message detection device in the aforementioned embodiment is usefully applied to, for example, a machine tool controlled via the network meeting the CAN standards. Moreover, since the same attack can be carried out on a network in which a collision of signals transmitted from communication devices is avoided using a method such as the above-described resynchronization, even if the network is a network not meeting the CAN standards, the fraudulent message detection device in the aforementioned embodiment is usefully applied.

Although the fraudulent message detection device according to one aspect of the present invention has been described above on the basis of the embodiment, the present invention is not limited to the embodiment. For example, the present invention may be achieved as a fraudulent message detection method including, as steps, the processes in the flowchart for monitoring CAN bus 200 and detecting a fraudulent message performed by the respective structural components of monitoring CAN controller 620 in the aforementioned embodiment. Further, each of the structural components may be configured as dedicated hardware, or realized by a processor such as a CPU executing a software program suitable for each structural component, as long as a sufficient processing speed is ensured. Each structural component may be realized as a result of, for example, the processor reading and executing a software program recorded on a recording medium such as a hard disk or a semiconductor memory. Here, the software program for achieving the fraudulent message detection device according to the embodiment is the following program.

A fraudulent message detection program according to one aspect of the invention is a fraudulent message detection program for causing a processor to execute a fraudulent message detection method for detecting a fraudulent message transmitted to a bus in a bus network, the fraudulent message detection method including: detecting an edge of a signal on the bus and determining whether resynchronization based on the edge is to be performed, so as to adjust a sampling point that is a point in time when a voltage of the bus is read to obtain a logical value of the signal during a one-bit period; obtaining a first logical value and a second logical value during a one-bit period after the resynchronization is determined to be performed in the detecting and determining, the first logical value being a logical value on the bus at a sampling point used before the edge is detected, the second logical value being a logical value on the bus at a sampling point after the resynchronization based on the edge is performed; comparing the first logical value and the second logical value obtained in the obtaining; and executing post-fraud-detection processing associated with a case in which a fraudulent message is detected, when the first logical value and the second logical value are determined not to match in the comparing.

Moreover, the present invention may be achieved as an ECU including the above-described fraudulent message detection device.

Although the fraudulent message detection device according to one aspect of the present invention has been described above on the basis of the embodiment, the present invention is not limited to the embodiment. Forms obtained by various modifications to the embodiment that can be conceived by a person skilled in the art as well as forms realized by combining structural components of different embodiments, which are within the scope of the essence of the present invention, may be included in the scope of one or more aspects of the present invention.

For example, although the synchronization time holder includes only first synchronization time holder 625 and second synchronization time holder 626 in the aforementioned embodiment, the number of synchronization time holders is not limited to two. By including, for example, at least three synchronization time holders, one monitoring CAN controller is capable of detecting different timings of attacks to receiving ECUs 100.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present invention can be applied to a CAN etc. used as a network to which devices capable of communicating using a communication protocol such as CDMA/CA are connected, such as an in-vehicle network.

What is claimed is:

1. A fraudulent message detection device that detects a fraudulent message transmitted to a bus in a bus network, the fraudulent message detection device comprising:
   a resynchronization detector that detects an edge of a signal on the bus and determines whether to perform resynchronization based on the edge, so as to adjust a sampling point that is a point in time when a voltage of the bus is read to obtain a logical value of the signal during a one-bit period;
   a receiver that obtains a first logical value and a second logical value during the one-bit period after the resynchronization detector determines to perform the resynchronization, the first logical value being a logical value on the bus at the sampling point used before the edge is detected, the second logical value being a logical value on the bus at the sampling point after the resynchronization based on the edge is performed;
   a comparator that compares the first logical value and the second logical value obtained by the receiver;
   a fraud detection processing unit that executes post-fraud-detection processing associated with a case in which the fraudulent message is detected, when the comparator determines that the first logical value and the second logical value do not coincide;
   a first synchronization time holder that holds the sampling point used before the resynchronization detector detects the edge; and
   a second synchronization time holder that holds the sampling point that is adjusted by the resynchronization based on the edge detected by the resynchronization,
   wherein the receiver obtains the first logical value at the sampling point held by the first synchronization time holder, and the second logical value at the sampling point held by the second synchronization time holder.

2. The fraudulent message detection device according to claim 1, wherein the fraud detection processing unit transmits a frame to the bus as the post-fraud-detection processing, the frame notifying occurrence of an error in communication on the bus network.

3. The fraudulent message detection device according to claim 1, wherein the bus network is a controller area network (CAN).

4. The fraudulent message detection device according to claim 1, wherein the fraudulent message detection device is included in an electronic control unit connected to the bus network.

5. An electronic control unit, comprising:
   the fraudulent message detection device according to claim 1, the electronic control unit being connected to an in-vehicle communication system including communication devices connected via the bus network.

* * * * *